(12) United States Patent
Hayashi et al.

(10) Patent No.: US 6,170,527 B1
(45) Date of Patent: Jan. 9, 2001

(54) MANIFOLD SOLENOID VALVE DRIVEN BY SERIAL SIGNALS

(75) Inventors: Bunya Hayashi; Fumio Morikawa; Katsuhisa Endo, all of Tsukuba-gun (JP)

(73) Assignee: SMC Corporation, Tokyo (JP)

( * ) Notice: Under 35 U.S.C. 154(b), the term of this patent shall be extended for 0 days.

(21) Appl. No.: 09/525,267

(22) Filed: Mar. 13, 2000

(30) Foreign Application Priority Data

Mar. 31, 1999 (JP) .................................................. 11-092393

(51) Int. Cl.[7] ....................................................... F16K 31/04
(52) U.S. Cl. ............................................. 137/884; 137/269
(58) Field of Search ..................................... 137/884, 269

(56) References Cited

U.S. PATENT DOCUMENTS

| | | |
|---|---|---|
| 4,854,346 | 8/1989 | Nakanshi et al. . |
| 5,222,524 | 6/1993 | Sekler et al. . |
| 5,458,048 * | 10/1995 | Hohner .................................. 91/459 |
| 5,519,636 | 5/1996 | Stoll et al. . |
| 5,699,830 | 12/1997 | Hayashi et al. . |
| 5,887,623 * | 3/1999 | Nagai et al. ........................... 137/884 |
| 5,915,666 | 6/1999 | Hayashi et al. . |
| 5,918,629 | 7/1999 | Hayashi et al. . |

FOREIGN PATENT DOCUMENTS

| | | |
|---|---|---|
| 0 603 395 | 6/1994 | (EP) . |
| 0 715 108 | 6/1996 | (EP) . |
| 0 860 609 | 8/1998 | (EP) . |
| WO 94/04831 | 3/1994 | (WO) . |

\* cited by examiner

Primary Examiner—John Fox
(74) Attorney, Agent, or Firm—Oblon, Spivak, McClelland, Maier & Neustadt, P.C.

(57) ABSTRACT

In a manifold solenoid valve drive-controlled by serial signals, control systems for a single valve and a double valve are achieved by simple switching in a single control system. For this purpose, in order to transmit serial signals to solenoid valves through manifold blocks 30 on which solenoid valves 20 are mounted and which are connected, a printed circuit board 45 having female/male connecting terminals 46a and 46b for transmitting serial signals, a slave chip 47 for extracting operation signals for the solenoid valves from the serial signals, and a feeder terminal 49 for supplying power to the solenoid valves 20 based on the operation signals is accommodated in each manifold block 30. The slave chip 47 can be switched between a single valve mode and a double valve mode, and a switching device 48 for performing the switching is provided on the manifold block 30. Bottom surfaces of a single valve and a double valve mounted on the manifold blocks are provided with setting sections 28 for switching and setting the switching devices 48 to make them compatible with the solenoid valves by mounting the solenoid valves 20.

3 Claims, 5 Drawing Sheets

MANIFOLD SOLENOID VALVE DRIVEN BY SERIAL SIGNALS

FIELD OF THE INVENTION

The present invention relates to a manifold solenoid valve drive-controlled by serial signals and, more particularly, to a manifold solenoid valve driven by serial signals that can be used regardless of whether a solenoid valve mounted on a manifold block is a single solenoid valve or a double solenoid valve, without the need for performing a positive switching operation.

DESCRIPTION OF THE RELATED ART

Conventionally, a manifold solenoid valve provided with a required number of solenoid valves, manifold blocks on which the solenoid valves are individually mounted and are interconnected, and an air supply/exhaust block that supplies and exhausts compressed air through the manifold blocks has been extensively used. The solenoid valves mounted on the manifold blocks generally come in single solenoid valves (normally three-port valves: hereinafter referred to simply as "single valves") in which a passage of a main valve is switched by a single solenoid, and double solenoid valves (normally five-port valves: hereinafter referred to simply as "double valves") in which a passage of a main valve is switched by two solenoids.

In the manifold solenoid valve, the respective solenoid valves mounted thereon can be drive-controlled by serial signals. In this case, however, the number of driven solenoids differs depending upon whether the solenoid valves are single valves or double valves, so that a control system has to be adapted to either of them. Furthermore, any of the solenoid valves respectively mounted on a plurality of manifold blocks consecutively connected are sometimes changed between single valves and double valves. Hence, there is a demand for making the control system that controls solenoid valves easily switchable.

DISCLOSURE OF THE INVENTION

A technological object of the present invention is to configure such a manifold solenoid valve so that, in implementing drive control of the manifold solenoid valve by serial signals, a control system for a single valve and that for a double valve can be configured by a switching operation in a single control system so as to automatically adapt the control system to solenoid valves simply by mounting the solenoid valves on manifold blocks when assembling the manifold solenoid valve, and also to permit the control system to be automatically switched simply by replacing solenoid valves when any solenoid valves mounted on manifold blocks are changed between single valves and double valves.

Another technological object of the present invention is to provide a manifold solenoid valve driven by serial signals that permits extremely easy assembly of the manifold solenoid valve and extremely easy maintenance, and eliminates a possibility of erroneous wiring.

A manifold solenoid valve in accordance with the present invention for fulfilling the aforesaid objects comprises a required number of solenoid valves and manifold blocks on which the solenoid valves are individually mounted and which are interconnected, supplies and exhausts compressed air to and from the respective solenoid valves through the manifold blocks, and transmits serial signals for operation control through the manifold blocks to control operations of the solenoid valves by the serial signals, wherein an electric circuit component having a printed circuit board provided with female and male connecting terminals for transmitting serial signals that are electrically connected with one another, a slave chip for extracting operation signals for the solenoid valves from the serial signals, and a feeder terminal for supplying power to the solenoid valves based on the operation signals, is installed in each manifold block, a switching device for switching and setting the slave chip between a single valve mode and a double valve mode, and a single valve and a double valve mounted on the manifold blocks are provided with setting sections for switching and setting the switching device between the single valve mode and the double valve mode when the solenoid valves are mounted on the manifold blocks.

In the foregoing manifold solenoid valve, the feeder terminal provided on the printed circuit board is projected to an opening in a top surface of the manifold block, and the feeder terminal can be disposed in a position where it is interconnected with a power receiving terminal provided on the solenoid valve as soon as the solenoid valve is communicated with a passage on the manifold block when the solenoid valve is mounted on the manifold block.

It is effective to constitute the switching device for switching and setting the slave chip between the single valve mode and the double valve mode by a switch for switching between connection and disconnection of a switching terminal in the slave chip to and from a ground end, and to construct the setting section of the switching device provided on the single valve and the double valve by a pressing surface that presses the switching device to connect or disconnect the switching terminal to or from the ground end, and a flank for avoiding a press on the switching device.

In the manifold solenoid valve driven by serial signals having the configuration set forth above, the electric circuit component comprised of the printed circuit board on which the female and male connecting terminals for transmitting serial signals, the slave chip for extracting operation signals, and the feeder terminal for supplying power to the solenoid valves are provided is installed in each manifold block, the switching device for switching and setting the slave chip between the single valve mode and the double valve mode is provided on each manifold block, and the single valve and the double valve are provided with the setting section for switching and setting the switching device between the single valve and the double valve when these solenoid valves are mounted on the manifold blocks. Therefore, simply by mounting the single valve or the double valve on the manifold block, the control system therefor can be automatically switched to suit the solenoid valve. Moreover, when solenoid valves on the manifold blocks are changed between single valves and double valves, the control system can be automatically switched merely by mounting the solenoid valves.

In addition, in the manifold solenoid valve described above, simply mounting the solenoid valves on the manifold blocks allows the manifold blocks and fluid passages between the solenoid valves to be connected, and the power receiving terminals of the solenoid valves to be connected to the feeder terminals, and also permits the control system for single valves or double valves to be switched to be compatible with the solenoid valves. Hence, assembling the manifold solenoid valve or changing solenoid valves between single valves and double valves requires simply connecting the fluid passages between the manifold blocks and the solenoid valves, obviating the need for positive switching or the like of the control system, as in the case of a conventional manifold solenoid valve. Thus, a manifold solenoid valve that permits various types of maintenance to be accomplished easily and eliminates a possibility of erroneous wiring can be obtained.

DETAILED DESCRIPTION

Figure 1:
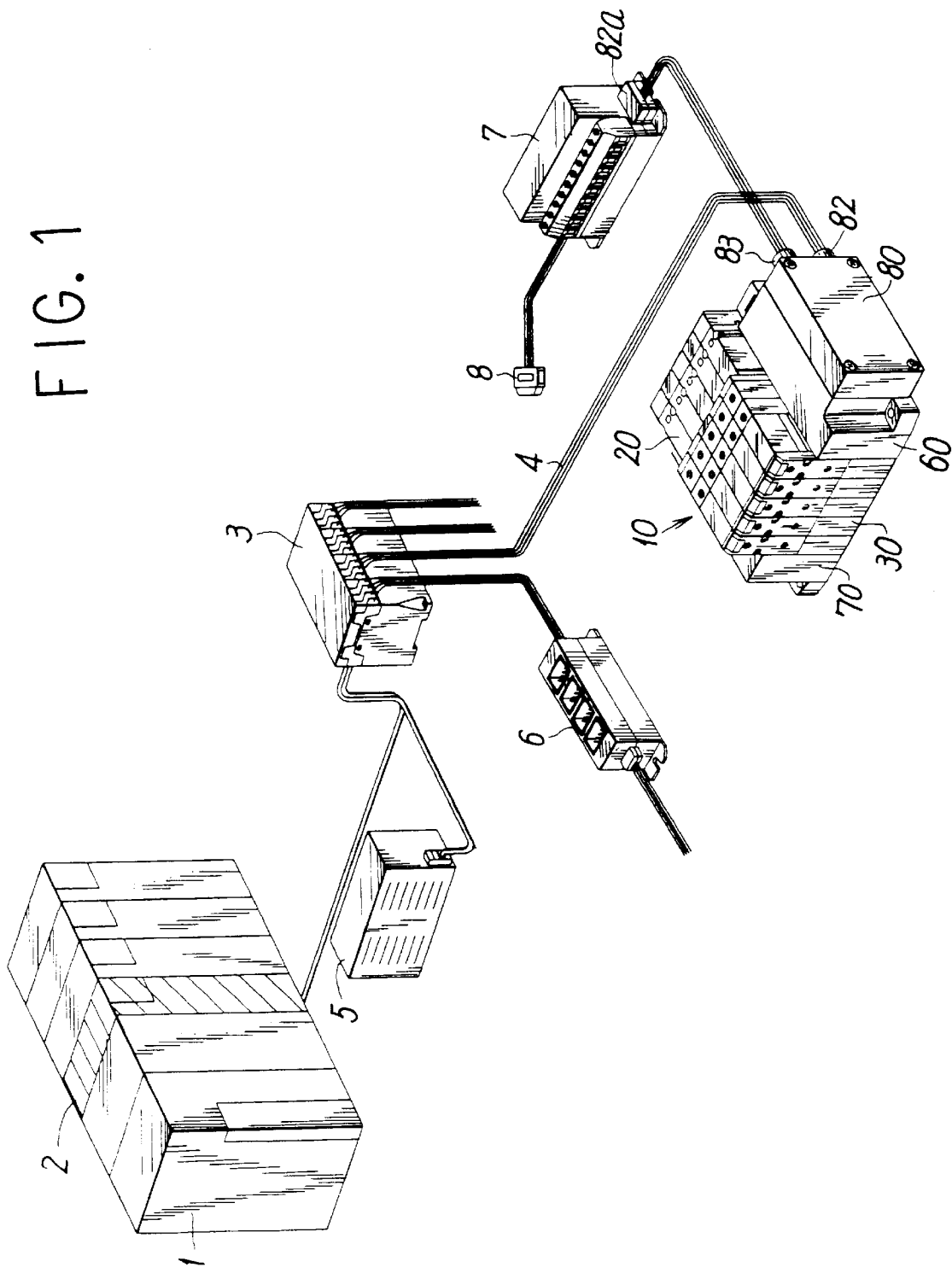
FIG. 1 is a perspective view showing an exemplary configuration of a control system for driving a manifold solenoid valve in accordance with the present invention by serial signals.

FIG. 1 shows an exemplary configuration of a control system for driving a manifold solenoid valve in accordance with the present invention by serial signals.

In the control system, serial signals are transmitted from a serial communication unit 2, an operation of which is controlled by a control unit 1, through a dedicated cable 4 via a gateway 3, to a manifold solenoid valve 10 and other equipment via a connector 6 as necessary. Drive power from a power unit 5 can be supplied together with the foregoing serial signals transmitted through the gateway 3 or supplied separately therefrom. An end unit 8 can be connected to the manifold solenoid valve 10 after connecting an analog device 7 or the like as necessary.

Figure 2:
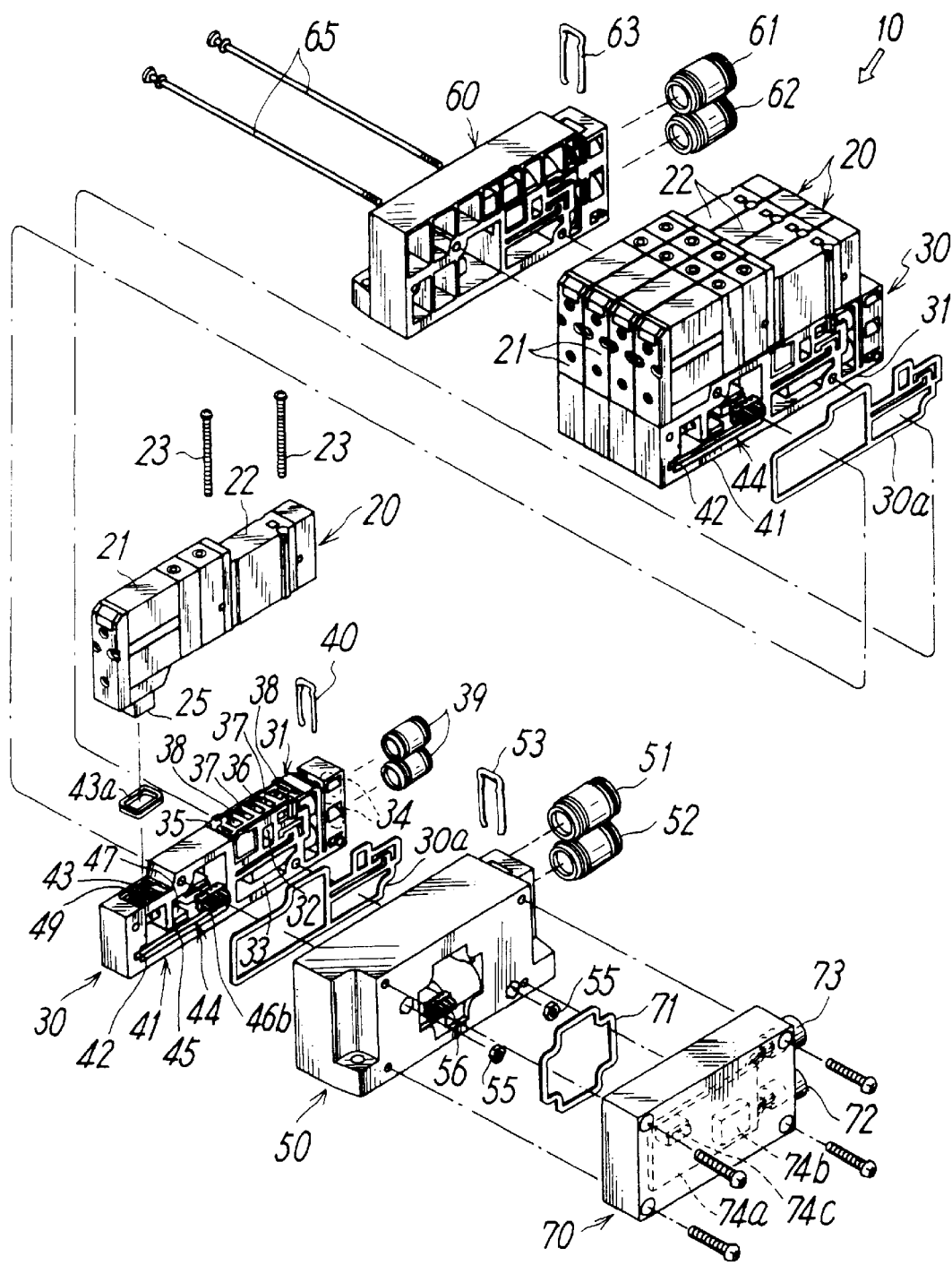
FIG. 2 is an assembly view showing an embodiment of the manifold solenoid valve in accordance with the present invention.

FIG. 2 shows an embodiment of the manifold solenoid valve 10 in accordance with the present invention, an operation of which is controlled by the foregoing serial signals.

The manifold solenoid valve 10 is equipped with solenoid valves 20 composed of three-port single valves or five-port double valves in a quantity required for various applications, a required quantity of manifold blocks 30 on which the solenoid valves 20 are individually mounted and which are interconnected, a supply/exhaust block 60 which is provided at one end of the connected manifold blocks 30 and which supplies and exhausts compressed air through the manifold blocks 30, an end block 70 provided at the other end of the connected manifold blocks 30, and a relay unit 80 which is attached to the supply/exhaust block 60 and which relays serial signals for operation control to be sent to the respective solenoid valves 20 from the gateway 3 through the manifold blocks 30.

Figure 3:
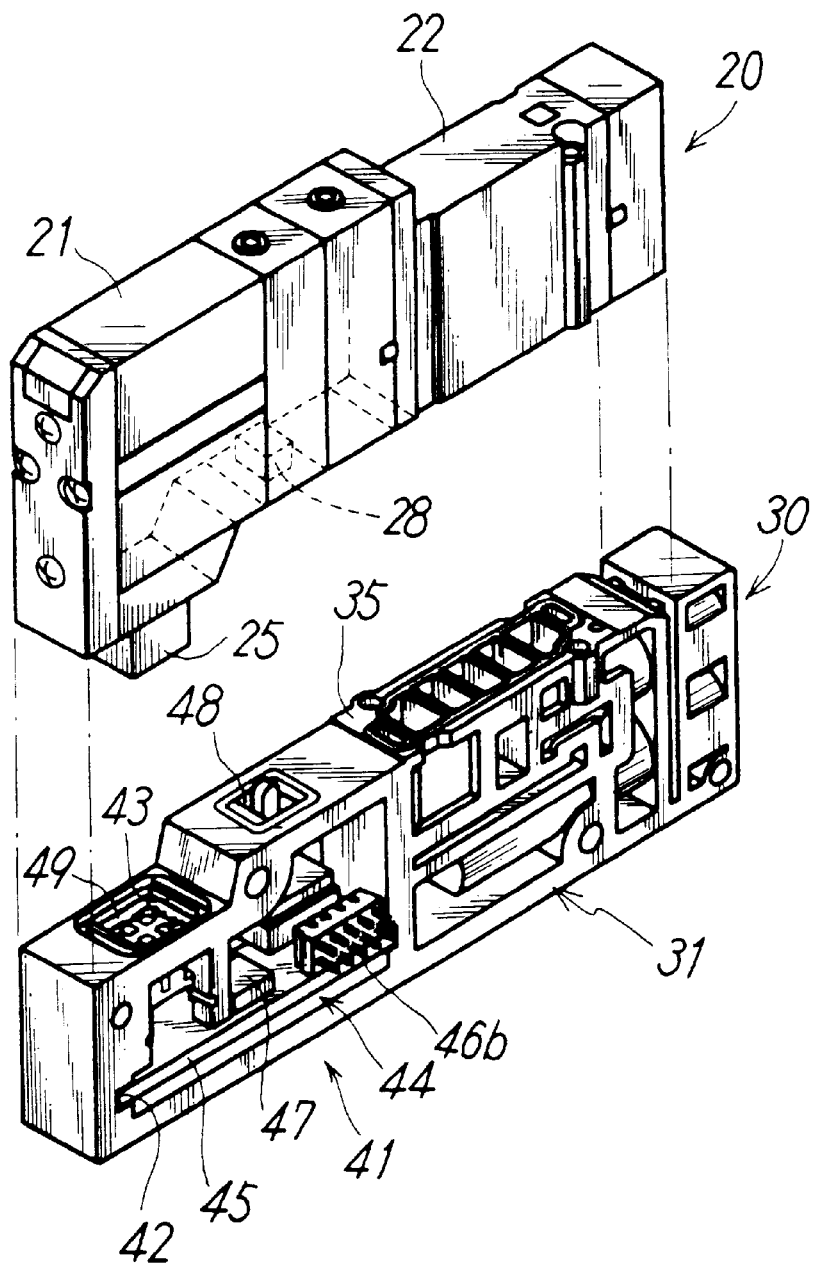
FIG. 3 is an assembly view showing a relational configuration of a manifold block and a solenoid valve (double valve) in the above embodiment.

The solenoid valve 20 is, as shown in FIG. 2 and FIG. 3, equipped with a single or a plurality of solenoids therein, and drives a three-port or five-port main valve 22 via a pilot valve 21, which is electromagnetically driven by the solenoids, or directly by the solenoids to thereby switch between air supply and exhaust in the main valve 22. The solenoid valve 20 is secured onto the manifold block 30 by mounting screws 23. The solenoid valve 20 is provided with a power receiving terminal 25 electrically connected to a feeder terminal 49, which will be discussed hereinafter, when it is fixed on the manifold block 30.

The solenoid valves 20 employ common manifold blocks 30 regardless of whether the solenoid valves 20 are of the three-port or five-port type, so that they can be constructed to have the same external shape, being different only in internal mechanism. A difference is that each of the bottom surfaces of a single valve and a double valve has a setting section 28 for switching and setting a switching device 48 on the manifold block 30, which will be discussed hereinafter in conjunction with FIG. 3 and FIG. 6, to the single valve mode or the double valve mode when the valves are mounted on manifold blocks 30.

The manifold block 30 is provided with a fluid passage section 31 and an electric circuit section 41. The two sections 31 and 41 may be formed into one piece by a synthetic resin or the like, or may be separately formed and then combined into one piece.

A passage provided in the fluid passage section 31 of the manifold block 30 is comprised primarily of, as in the case of a well-known manifold block, a common passage 32 for air supply and a common passage 33 for exhaust which penetrate the manifold blocks 30 to establish mutual communication with a passage (not shown) in the supply/exhaust block 60, and output passages that supply and discharge an output fluid from the solenoid valves 20 to two output ports 34 and 34 provided in one end surface of the manifold block 30. As necessary, a passage for supply and discharge for a pilot valve is additionally provided. Furthermore, a supply channel 36, output channels 37, exhaust channels 38, etc. for establishing communication between the common passages and the output passages, or the passage for supply/discharge for a pilot valve and supply/discharge openings provided in a mounting surface of the manifold block 30 in the solenoid valve 20 are provided in a solenoid valve mounting surface 35 at a top.

Output port couplers 39 and 39 attached to the output ports 34 and 34 are provided with locking grooves around themselves. The locking grooves are fitted in the output ports 34 and 34 of the manifold block 30, and legs of a U-shaped pin 40 inserted from above the manifold block 30 are engaged with the locking grooves for a securing purpose.

The embodiment described above is based on an assumption that the solenoid valve 20 is provided with two solenoids that are five-port double valves. If the five-port double valves are replaced by three-port single valves, then one solenoid, output port, etc. are rendered effective, while the other one that is unnecessary is rendered ineffective or omitted.

Figure 4:
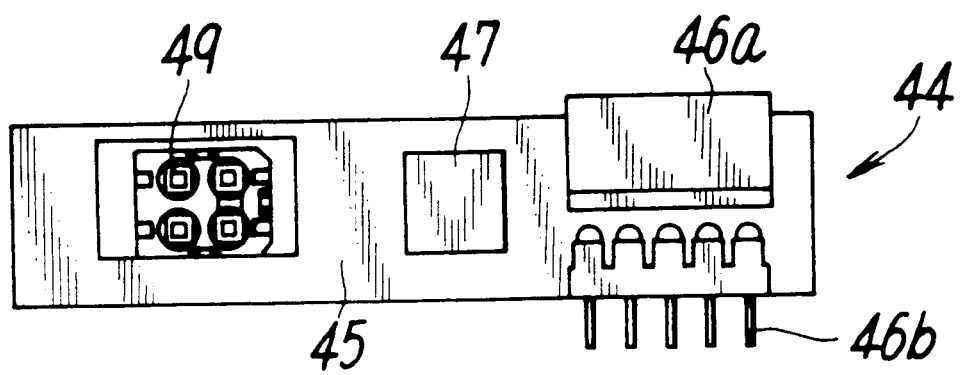
FIG. 4 is a top plan view showing an exemplary configuration of an electric circuit component mounted on the manifold solenoid valve.
Figure 5:
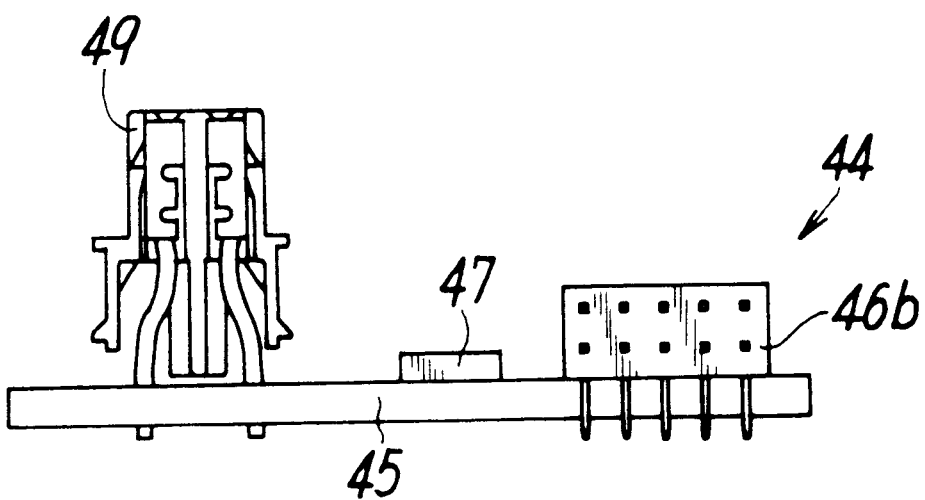
FIG. 5 is a side view of the electric circuit component mounted on the manifold solenoid valve shown in FIG. 4.

The electric circuit section 41 accommodates an electric circuit component 44 therein. As shown in FIG. 4 and FIG. 5, the electric circuit component 44 is provided with female/male connecting terminals 46a and 46b for transmitting serial signals, a slave chip 47 for extracting operation signals for the solenoid valves 20 from serial signals, and the feeder terminal 49 for supplying power to the solenoid valves 20 based on the operation signals, which are all mounted on a printed circuit board 45 and are electrically interconnected by printed wiring on the printed circuit board 45. Furthermore, a switching device 48 which is connected to the slave chip 47 to switch the slave chip 47 between the single valve mode and the double valve mode is provided on a top surface of the manifold block 30 as clearly shown in FIG. 3. The switching device 48 is comprised of a switch 52 for switching between connection and disconnection of a switching terminal 51 in the slave chip 47 to and from a terminal 55 at a ground end, as will be discussed hereinafter with reference to FIG. 6.

The bottom surface of the solenoid valve 20 is provided with the setting section 28 that acts on the switch 52 to switch and set it when the solenoid valve 20 is mounted on the manifold block 30 in order to automatically switch and set the switching device 48 comprised of the switch 52, depending on whether the solenoid valve 20 is a single valve or a double valve, when the solenoid valve 20 formed by a single valve or a double valve is mounted on the manifold block 30. When the solenoid valve 20 is a single valve, its setting section 28 has a pressing surface (a flat surface or a protruding surface) for pressing the switch 52 of the switching device 48 to connect the switching terminal 51 to the ground terminal 55. When the solenoid valve 20 is a double valve, its setting section 28 is formed of a flank (a concave portion) to avoid pressing the switch 52 of the switching device 48 so as to release the switching terminal 51 as shown by the solenoid valve 20 of FIG. 3. Hence, merely mounting the solenoid valve 20 (the single valve or the double valve) on the manifold block 30 automatically switches the switching device 48 of the slave chip 47 to the single valve mode or the double valve mode. As an alternative, the switch 52 of the switching device 48 may be pressed by the pressing surface to release the switching terminal 51, and a press on the switch 52 of the switching device 48 may be avoided by the flank to thereby connect the switching terminal 51 to the ground terminal 55.

In the electric circuit component 44 having the female and male connecting terminals 46a and 46b, the slave chip 47, and the feeder terminal 49 provided on the printed circuit board 45, as shown in FIG. 2 and FIG. 3, a mounting groove 42 for the printed circuit board 45 is formed in the electric circuit section 41 of the manifold block 30, and the printed circuit board 45 is fitted and fixed in the mounting groove 42 to be thereby fixedly installed in a predetermined position in the electric circuit section 41. It is suited for the printed circuit board 45 to be fixed by screws or the like or stably and detachably fixed by, for example, providing it with a member that elastically engages with the mounting groove 42 when the printed circuit board 45 is inserted in a predetermined position of the mounting groove 42. A flexible circuit board may be used for the printed circuit board 45.

The female and male connecting terminals 46a and 46b on the printed circuit boards 45 in the adjoining manifold blocks 30 are disposed back-to-back at opposing plate edges on the printed circuit boards 45. Thus, when the printed circuit board 45 is fitted in the predetermined position, the female and male connecting terminals 46a and 46b are provided outwardly at predetermined positions of a surface where the manifold blocks 30 are interconnected. When adjoining manifold blocks 30 are connected at the surface where they are joined to one another by the positioning, the female and male connecting terminals 46a and 46b in the adjoining manifold blocks 30 are interconnected as soon as the common passages 32 and 33 in the manifold blocks 30 are communicated with one another.

An opening 43 for a feeder terminal is provided in a top surface of the electric circuit section 41 in the manifold block 30, and the feeder terminal 49 on the printed circuit board 45 is jutted out to the opening 43. The feeder terminal 49 may be fixedly provided on the printed circuit board 45, or semi-fixedly provided to permit positional adjustment by installing it via a member that is flexible to a certain extent, or connected via a flexible lead wire connected at a predetermined position of the printed circuit board 45, provided that the feeder terminal 49 is disposed at a position where it projects to the opening 43 when the printed circuit board 45 is fitted at a predetermined position of the mounting groove 42 in the electric circuit section 41, or the feeder terminal 49 is disposed at a position where it faces the opening 43 and fixed there by an appropriate means.

Thus, by providing the feeder terminal 49 at a position where it faces the opening 43 in the top surface of the manifold block 30, the feeder terminal 49 is provided at the predetermined position on the manifold block 30. More specifically, when the solenoid valve 20 is mounted on the solenoid valve mounting surface 35 on the manifold block 30 via a gasket, and the supply/discharge opening provided in the solenoid valve 20 is communicated with the supply channel 36, the output channel 37, the exhaust channel 38, etc. opened in the fluid passage 31, the feeder terminal 49 is disposed at the position where it is interconnected with the receiving terminal 25 provided on the solenoid valve 20. When the feeder terminal 49 and the receiving terminal 25 are connected, a connector gasket 43a is placed around the opening 43 to seal the electrically connected portion.

It is needless to say that, the moment the solenoid valve 20 is mounted on the manifold block 30, the switching device 48 of the slave chip 47 is automatically switched to the single valve mode or the double valve mode by the setting section 28.

A plurality of the manifold blocks 30 described above are connected. The supply/exhaust block 60 for supplying and exhausting compressed air through the connected manifold blocks 30 is provided on one end of the connected manifold blocks 30 and the end block 70 is provided at the other end.

The supply/exhaust block 60 is provided with an air supply coupler 61 and an exhaust coupler 62 on its one end surface. The air supply coupler 61 and the exhaust coupler 62 are communicated with the common passage 32 for air supply and the common passage 33 for exhaust that penetrate the respective manifold blocks 30 to supply air from outside to the common passage 32, and air from the respective solenoid valves 20 is exhausted through the common passage 33. The supply/exhaust couplers 61 and 62 are fixed by engaging legs of a U-shaped pin 63 inserted from above the supply/exhaust block 60 with locking grooves provided around peripheries of the couplers 61 and 62, as in the case of the output port coupler 39 mentioned above. Although not shown, a surface of the supply/exhaust block 60 where it is joined to the manifold block 30 is provided with a female connecting terminal connected to the male connecting terminal 46b provided on the manifold block 30, and a male connecting terminal 66 electrically connected therewith is further provided on an outer surface of the block 60.

The end block 70 is positioned at either end of the manifold blocks 30 consecutively installed together with the supply/exhaust block 60, and they are connected by tension bolts 75 and fixing nuts 65. The end block 70 also closes ends of the common passages 32 and 33, etc. provided such that they penetrate the manifold blocks 30. At the time of connection, gaskets 30a are installed between the respective manifold blocks 30 and between the manifold block 30, the supply/exhaust block 60, and the end block 70 so as to individually seal the fluid passage section 31 and the electric circuit section 41 in the manifold block 30. The gaskets 30a may be installed, taking the fluid passage section 31 and the electric circuit section 41 as discrete units in the manifold block 30.

In the end block 70, a supply coupler 71 and an exhaust coupler 72 can be provided in addition to the supply coupler 61 and the exhaust coupler 62 in the supply/exhaust block 60. In this case also, the two couplers 71 and 72 are fixed using a U-shaped pin 73 inserted from above the end block 70. Although not shown, the end unit 8 (refer to FIG. 1) can be accommodated in the end block 70.

A relay unit 80 attached to the supply/exhaust block 60 via a gasket 81 in a sealed state relays serial signals for operation control from the gateway 3 to be sent to the respective solenoid valves 20 through the manifold blocks 30, and functions to receive and transmit the serial signals. The relay unit 80 is equipped with serial signal connecting terminals 82 and 83 for receiving and transmitting. In the relay unit 80, a required electric or electronic component 84b and a female connecting terminal 84c for transmitting serial signals that is connected to the male connecting terminal 66 in the supply/exhaust block 60 are provided on a printed circuit board 84a.

The relay unit 80 may be installed to one or both of the supply/exhaust block 60 and the end block 70, and may be formed integrally with the supply/exhaust block 60 or the end block 70.

Figure 6:
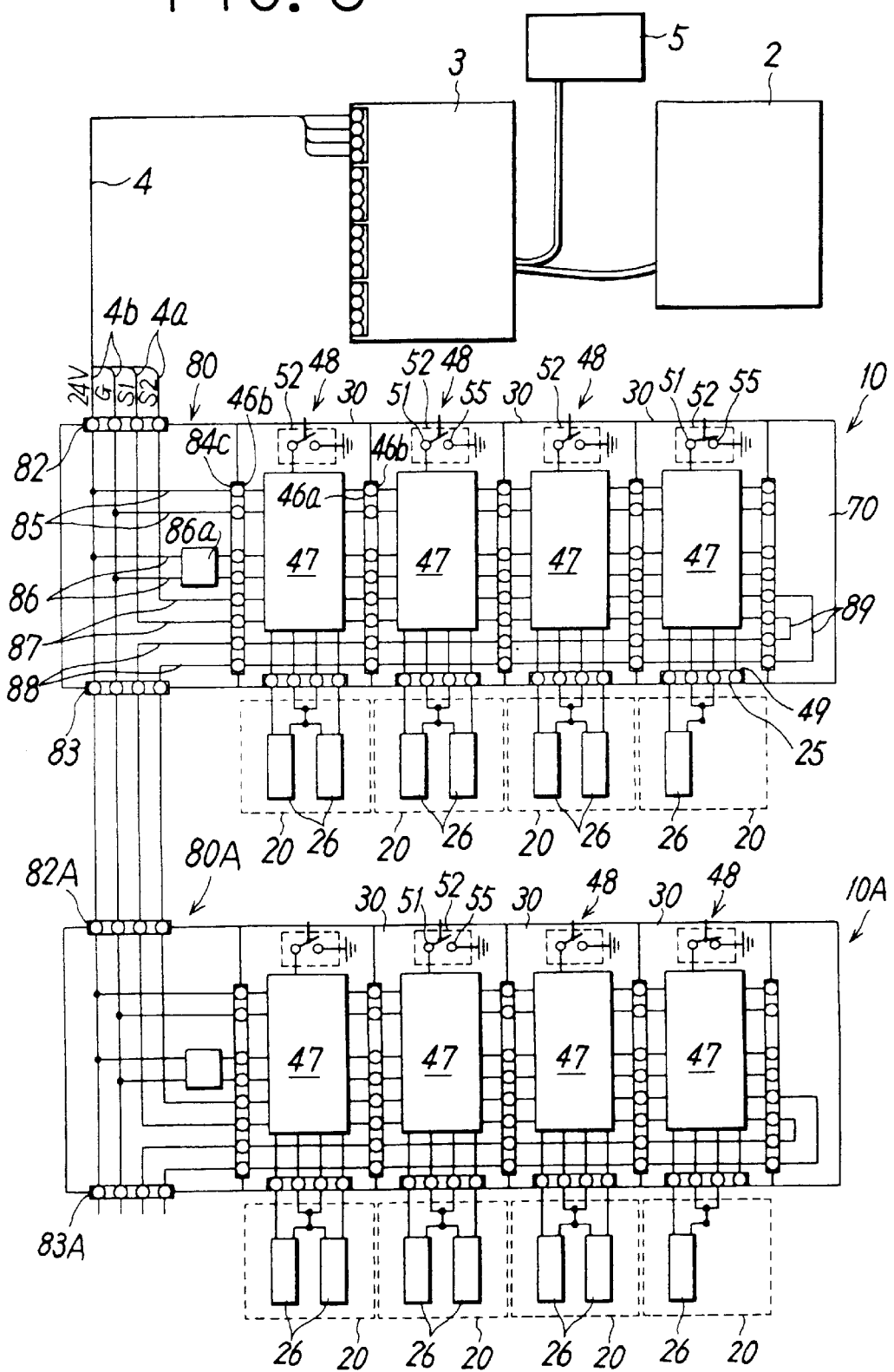
FIG. 6 is a schematic explanatory view showing an outline of signal lines in a relay unit and manifold blocks in the control system of the manifold solenoid valve.

FIG. 6 schematically shows signal lines in the relay unit 80 and the manifold block 30 in the control system of the manifold solenoid valve 10. In the control system, as described in conjunction with FIG. 1 previously, serial signals and power signals are transmitted via the gateway 3 from the serial communication unit 2 and the power unit 5, and further transmitted via the receiving connecting terminal 82 to the relay unit 80 provided in the manifold solenoid valve 10 through the dedicated cable 4 comprised of a serial signal line 4a and a power signal line 4b. The drive power from the power unit 5 can alternatively be supplied separately from serial signals transmitted through the gateway 3. As necessary, a transmitting end of the relay unit 80 can be connected to a similar relay unit 80A of a manifold solenoid valves 10A or other analog equipment 7, etc. in succession via connecting terminals 83 and 82A, and their transmitting ends can be also connected to other equipment, etc. via the connecting terminal 83A.

Serial signals introduced into the relay unit 80 are transmitted from the female connecting terminal 84c provided therein to slave chips 47 on the printed circuit board 45, which is accommodated in the manifold block 30, via the supply/exhaust block 60, which is omitted in FIG. 6, (see FIG. 1 and FIG. 2) and further via the male connecting terminal 46b of the manifold block 30 adjacent to the block 60. Operation outputs for supplying or cutting off power to the solenoid valves 20 mounted on the individual manifold blocks 30 are provided by switching operation of an output circuit based on serial signals in the respective slave chips 47. The outputs are transmitted to the respective solenoid valves 20 from the feeder terminals 49 via the receiving terminals 25 of the solenoid valves 20. The serial signals are transmitted in sequence to the slave chips 47, which control the operations of the solenoid valves 20 in the following stage, via the female and male connecting terminals 46a and 46b.

The solenoids 26 provided on the solenoid valves 20 function to operate pilot valves 21, among which only one solenoid 26 provided on the single solenoid valve 20 makes up a single valve (a three-port valve), while two solenoids 26 provided on the single solenoid valve 20 make up a double valve (a five-port valve).

Transmission lines 85 connected to the slave chips 47 are power lines for driving solenoid valves, transmission lines 86 are control power lines connected via a 5V power source 86a, transmission lines 87 are signal lines for transmitting serial signals, and transmission lines 88 are return signal lines for serial signals. In the drawing, reference numeral 89 denotes a short-circuit line provided in the end block 70.

A control system in the manifold solenoid valve 10A connected via the connecting terminals 83 and 82A to the transmitting end of the relay unit 80 provided in the manifold solenoid valve 10 is substantially the same as the manifold solenoid valve 10. Hence, primary identical or equivalent parts will be assigned like reference numerals, and descriptions thereof will be omitted.

Depending on whether the solenoid valves 20, the drive of which is controlled by the slave chips 47, are the single valves or the double valves, the control system must be adapted accordingly. For this purpose, the slave chips 47 are configured so that they can be switched between the single valve mode and the double valve mode by the switching devices 48 described above with reference to FIG. 3. For the switching devices 48, the switches 52 or the like that protrude on the manifold blocks 30 may be used. As shown in FIG. 6, the switching terminals 51 are connected or disconnected to or from the ground terminal 55 by the switch 52 to thereby make it possible to switch the slave chips 47 to the single valve mode or the double valve mode. In FIG. 6, a state wherein the switching terminal 51 is connected to the ground terminal 55 is the single valve mode, while a state wherein the switching terminal 51 is released is the double valve mode. It is also possible to press the switch 52 protruding on the manifold block 30 to release the switching terminal 51 so as to set the slave chip 47 to the double valve mode, and to release a press on the switch 52 to connect the switching terminal 51 to the ground terminal 55 so as to set the slave chip 47 to the single valve mode.

Thus, by providing the slave chips 47 constituting the control system for driving the solenoid valves 20 on the printed circuit board 45 installed in the electric circuit section 41 of each manifold block 30, and by making them switchable between the single valve mode and the double valve mode by means of the simple switching device 48 comprised of the switch 52 or the like attached thereto, it becomes possible to automatically adapt the control system to the solenoid valves 20 when assembling the manifold solenoid valve 10 and also to automatically switch the control system that controls the solenoid valves to the single valve mode or the double valve mode when changing any of the solenoid valves 20 mounted on the manifold blocks 30 between the single valves and the double valves.

Moreover, in the manifold solenoid valve 10 set forth above, simply stacking and connecting the manifold blocks 30 permits fluid passages and serial signal lines to be automatically connected, or simply detaching the manifold blocks 30 permits the electric circuit component 44 constituting the control system to be taken out. Hence, the manifold solenoid valve 10 can be assembled with great ease, and a manifold solenoid valve that enables various types of maintenance to be implemented easily and eliminates a possibility of erroneous wiring can be obtained.

According to the manifold solenoid valve driven by serial signals in accordance with the present invention described in detail above, in controlling the drive of the manifold solenoid valve by serial signals, both control systems for single valves and double valves can be configured by a switching operation in a single control system, and the control system is automatically adapted to the solenoid valves merely by mounting the solenoid valves on the manifold blocks. This makes it possible to automatically adapt the control system to solenoid valves when assembling a manifold solenoid valve and also to automatically switch the control system by simply changing solenoid valves when changing any of the solenoid valves mounted on manifold blocks between single valves and double valves. Furthermore, in the manifold solenoid valve, the moment the manifold blocks are connected, serial signal lines for controlling the solenoid valves are connected, thus permitting extremely easy assembly and easy maintenance, and also eliminating a possibility of erroneous wiring.

What is claimed is:

1. In a manifold solenoid valve that comprises a required number of solenoid valves and manifold blocks on which the solenoid valves are individually mounted and which are interconnected, supplies and exhausts compressed air to and from the respective solenoid valves through the manifold blocks, and transmits serial signals for operation control through the manifold blocks to control operations of the solenoid valves by the serial signals, a manifold solenoid valve driven by serial signals wherein;

an electric circuit component provided with female and male connecting terminals for transmitting serial signals that are electrically connected with one another, a slave chip for extracting operation signals for the solenoid valves from the serial signals, and a feeder terminal for supplying power to the solenoid valves based on the operation signals, which are mounted on a printed circuit board, is installed in each manifold block;

a switching device for switching and setting the slave chip between a single solenoid valve mode and a double solenoid valve mode is provided on each manifold block; and a solenoid valve of a single solenoid and a solenoid valve of a double solenoid mounted on the manifold blocks are provided with a setting section for switching and setting the switching device to be compatible with the respective solenoid valves when the solenoid valves are mounted on the manifold blocks.

2. A manifold solenoid valve driven by serial signals according to claim 1, wherein;

the feeder terminal provided on the printed circuit board is projected to an opening in a top surface of the manifold block, and the feeder terminal is disposed in a position where it is interconnected with a power receiving terminal provided on the solenoid valve as soon as the solenoid valve is communicated with a passage on the manifold block when the solenoid valve is mounted on the manifold block.

3. A manifold solenoid valve driven by serial signals according to claim 1 or 2, wherein;

the switching device for switching and setting the slave chip between the single solenoid valve mode and the double solenoid valve mode is formed by a switch for switching between connection and disconnection of a switching terminal in the slave chip to and from a ground end, and;

the setting section of the switching device provided on the solenoid valve of the single solenoid and the solenoid valve of the double solenoid is formed by a pressing surface that presses the switching device to connect or disconnect the switching terminal to or from the ground end, and a flank for avoiding a press on the switching device.

* * * * *